United States Patent [19]

Osborne

[11] 4,165,031
[45] Aug. 21, 1979

[54] SHORT DEPTH RETURNABLE BOTTLE CONTAINER

[75] Inventor: Edward L. Osborne, Kansas City, Kans.

[73] Assignee: Westvaco Corporation, New York, N.Y.

[21] Appl. No.: 888,835

[22] Filed: Mar. 22, 1978

[51] Int. Cl.² .................................................. B65D 5/22
[52] U.S. Cl. .................................. 229/34 R; 229/6 A
[58] Field of Search ............... 229/34 R, 34 A, 6 A, 229/31 R, 31 FS, 35

[56] References Cited

U.S. PATENT DOCUMENTS

| 674,220 | 5/1901 | Scott | 229/34 R |
|---|---|---|---|
| 2,143,308 | 1/1939 | Flach | 229/34 R |
| 2,341,928 | 2/1944 | Levkoff | 229/34 R |
| 2,893,621 | 7/1959 | Harnish et al. | 229/34 R |
| 3,001,685 | 9/1961 | Blount | 229/34 R |
| 3,381,879 | 5/1968 | Belcher et al. | 229/34 R |
| 3,973,723 | 8/1976 | Owens | 229/34 R |

FOREIGN PATENT DOCUMENTS 465378  12/1968  Switzerland .................. 229/34 R Primary Examiner—Joseph Man-Fu Moy

[57] ABSTRACT

A reusable container for shipping returnable bottles of soda or beer is prepared from a single flat blank of material such as corrugated paperboard without stitching, gluing or stapling. The folding sequence is arranged such that the container comprises double thick side walls, end walls prepared from five thicknesses of material, a triple thick bottom and a captured wire rim reinforcing member in the upper end. The resulting container has increased strength and durability as compared with prior art containers of the same type.

4 Claims, 7 Drawing Figures

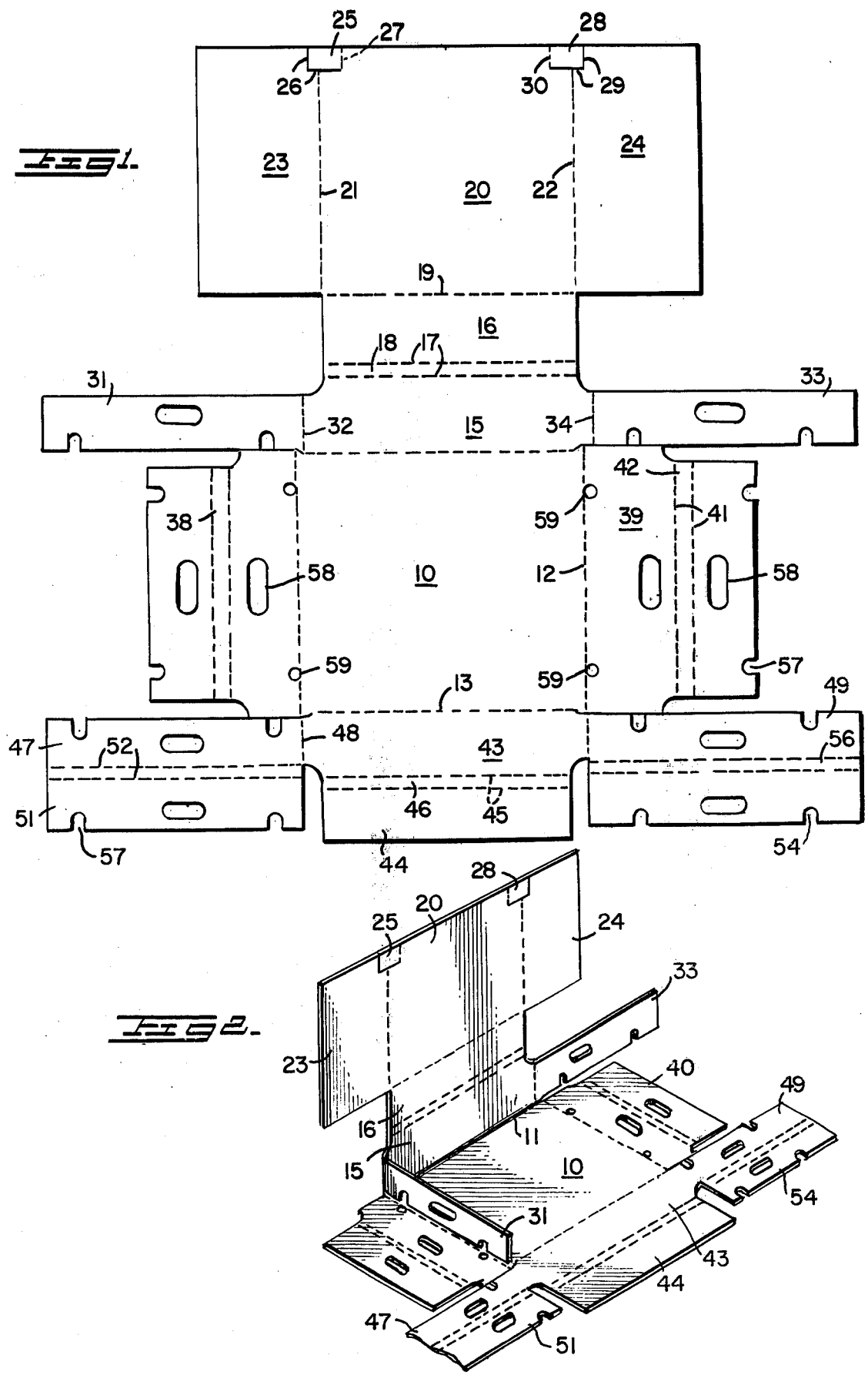

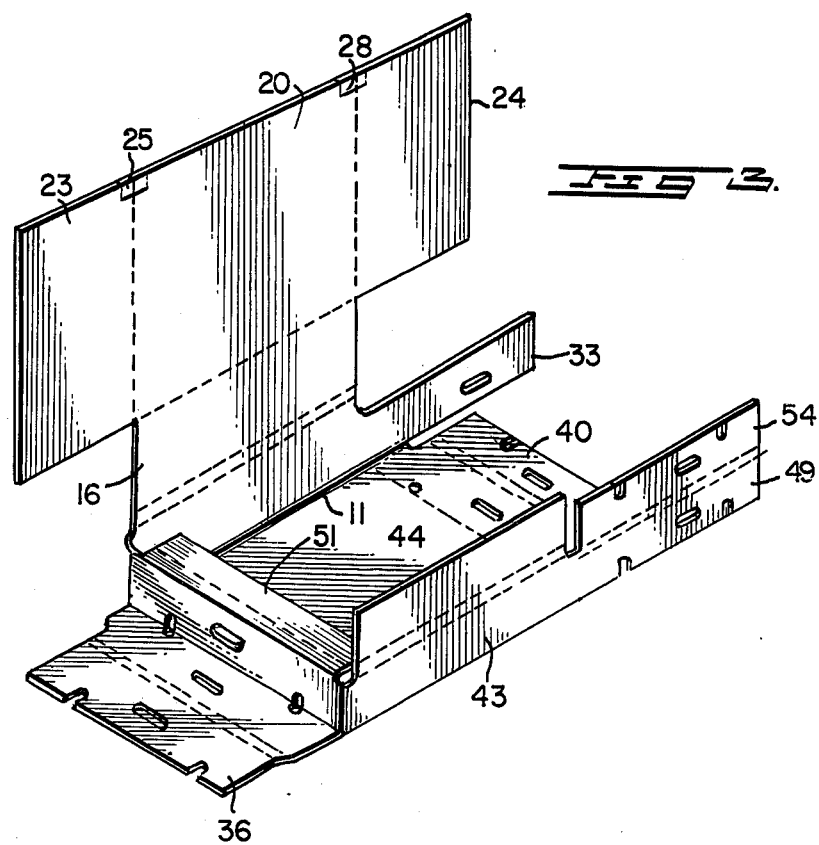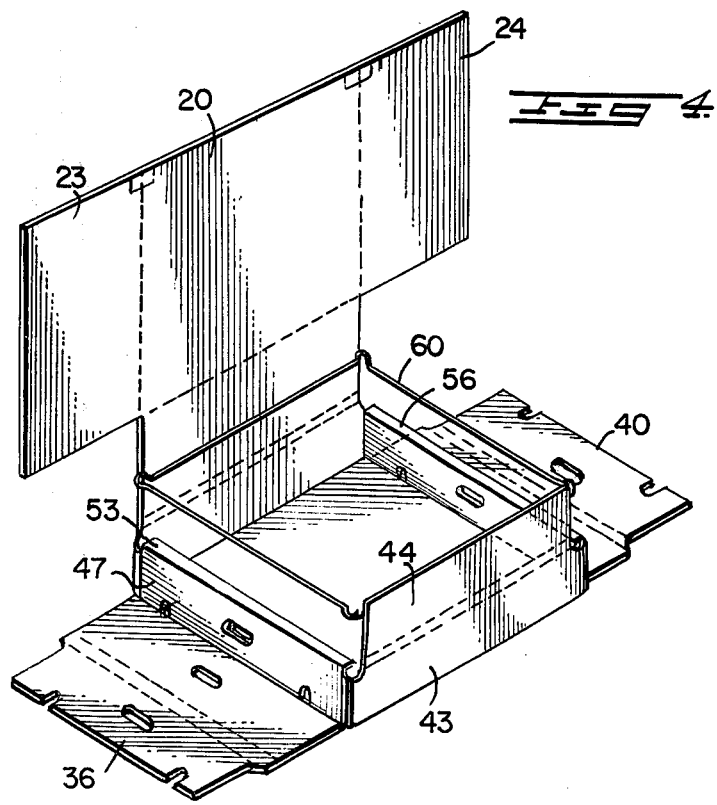

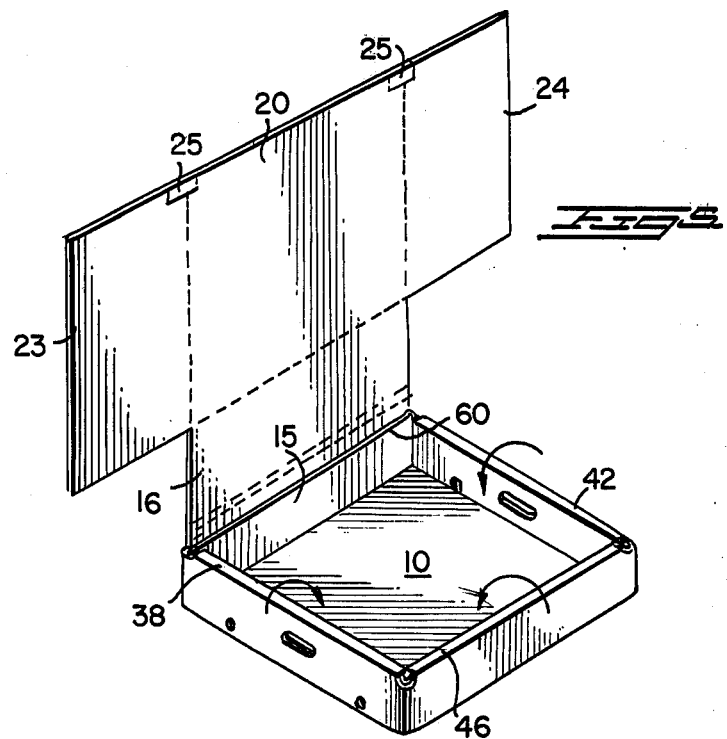
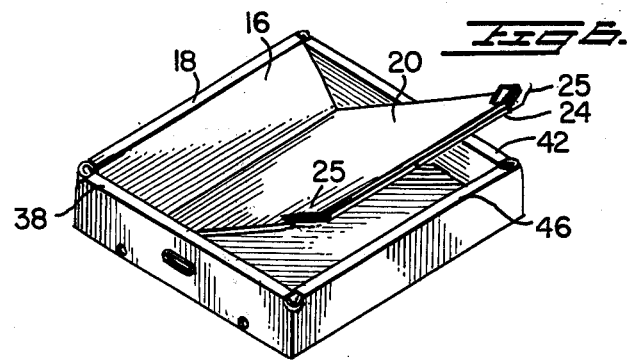
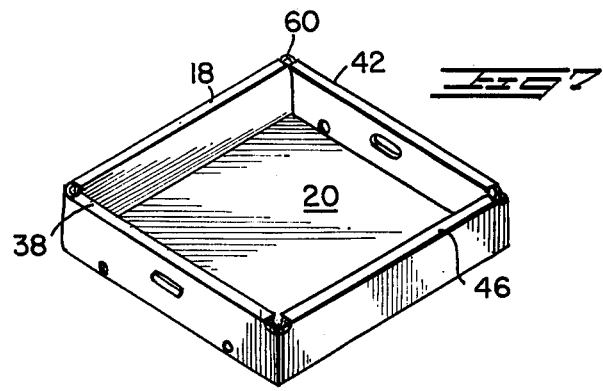

SHORT DEPTH RETURNABLE BOTTLE CONTAINER

BACKGROUND OF INVENTION

The present invention relates generally to a reuseable storage and shipping container that is folded into its container configuration from a one piece blank of material such as paperboard. More particularly, the invention relates to a returnable beverage container of short depth for shipping soda or beer in returnable bottles. Containers of the type disclosed require reinforced upper ends because they are repeatedly picked up by hand. Moreover, the end walls which contain the handhole cut outs must be extra strong to withstand the stresses involved. And, finally, the bottoms must be substantial enough to withstand repeated use.

To satisfy these purposes, the container of the present invention incorporates a wire rim reinforcing member at its top, utilizes five thicknesses of corrugated paperboard material for its end walls and has a triple thick bottom. The most closely related constructions to the present invention are disclosed in U.S. Pat. Nos. 2,947,462 and 3,669,339. However, it will be noted that in each of the above noted patents, the containers are prepared from multiple blanks of material. Thus, the construction of the present invention is easier to set up and has greater strength than the aforementioned prior art containers. Moreover, the construction of the present invention does not require any staples, gluing or stitching.

SUMMARY OF INVENTION

The present invention relates generally to a returnable short depth beverage case for shipping soda or beer in returnable bottles. The short depth of the container is necessary to enable the container to accomodate a bottle extractor (de-caser) when the empty bottles are returned. It may be recognized, however, that the container of the present invention could just as readily be used for shipping and storing other heavy articles, and in particular, for use where the container is picked up by hand, or where the container is subjected to large compressive stacking loads, or the deteriorating effects of the environment.

The container of the present invention is folded into its container configuration from a one piece blank of paperboard that is preferably pretreated to be water resistant. The blank is cut and scored to form a plurality of panels and flaps which together produce a strong and serviceable final construction with two ply thick side walls, five ply thick end walls, a wire reinforced upper end and a triple thick bottom. The end walls are made especially thick because they are provided with hand hole cut outs that weaken the panels, but which enable the container to be picked up by hand as often as necessary. The end walls and container bottom are also provided with strategically located drain holes for water removal and for drainage from the container of the contents of any broken bottles. The various panels of the container are formed on the blank to provide the maximum compressive stress and are folded so as to minimize the number of exposed fluted edges. The wire rim reinforcing member at the top of the container is so utilized that it becomes an integral part of the container. The shoulder supports provided for the wire rim serve to hold it in place during set up so that no external holding devices are necessary. With the present emphasis by the beverage industry on returnable bottles, the container of the present invention fulfills all of the requirements for the transition from throwaway bottles to returnables.

DESCRIPTION OF DRAWING

FIG. 1 is a plan view of a blank of material, preferably corrugated paperboard, from which the container of the present invention may be constructed;

FIGS. 2–6 show in perspective, steps in the folding sequence for setting up the container; and, FIG. 7 shows a completely folded container.

DETAILED DESCRIPTION

Referring now in more detail to the drawing, wherein like parts are indicated in each view by like reference numerals, FIG. 1 is seen to illustrate a substantially rectangularly shaped blank of corrugated paperboard that is cut and scored to provide the different panels and flaps necessary for forming the container of the present invention. The corrugated material from which the blank is formed is preferably constructed from Westvaco's "Cote-A-Cor 600" wax-impregnated, curtain coated paperboard, described fully in U.S. Pat. No. 2,982,333. The preferred material renders the container formed therefrom substantially waterproof and capable of withstanding the varied environmental conditions to which it might be subjected. Thus, the blank of FIG. 1 consists of a centrally located first bottom panel 10 around which the side and end walls are located. At the nominal top of the blank in FIG. 1, there is a first multiple side wall 15,16 foldably attached thereto along a score line 11. The side walls 5,16 are separated from one another by a pair of spaced and parallel score lines 17 between which is located a shoulder panel 18. Shoulder panel 18 along with the remaining shoulder panels of the container are more fully described hereinafter. Attached to side wall 16 along another score line 19 is a second bottom panel 20. Second bottom panel 20 is adapted to be folded over first bottom panel 10 as described later. Meanwhile, second bottom panel 20 has attached at each side thereof along score lines 21,22 a pair of intermediate bottom panels 23,24 respectively. During the formation of the container, intermediate bottom panels 23,24 are folded over about score lines 21,22 and sandwiched between the first and second bottom panels 10 and 20 to form a bottom wall for the container of three thicknesses of material. In addition, the second bottom panel 20 and the intermediate bottom panels 23,24 are also applied with symmetrically arranged locking tabs 25,28 formed by cut and score lines 26,27 and 29,30. The locking tabs 25,28 are utilized in the final folding step as friction locks for retaining the various panels of the container in their folded and set up condition.

At the nominal bottom of the blank in FIG. 1, the opposite side wall is seen to be formed by panels 43 and 44 which are foldably attached to the first bottom panel 10 along a score line 13. Panels 43,44 are separated from one another by a pair of spaced and parallel score lines 45 between which there is located another shoulder panel 46. During set up of the container the two panels 43,44 are folded into side-by-side relation and are spaced apart by the shoulder panel 46. At each side of panel 43, there is located a pair of end wall panels 47,51 and 49,54 attached thereto along score lines 48 and 50 respectively. The end wall panels 47,51 and 49,54 when folded, contribute to forming the five panel end walls of the container. Thus, the panels 47,51 are separated from one another by a pair of spaced and parallel score lines 52 which form another shoulder panel 53 of the container. At the opposite side, panels 49,54 are separated from one another by a pair of spaced and parallel score lines 55 which form the shoulder panel 56 of the container. During set up of the container, shoulders 53 and 56 serve as support members for the wire rim insert 60 used to reinforce the top of the container.

The primary end walls of the container are constructed from a pair of end wall panels 35,36 and 39,40 which are foldably attached to bottom panel 10 along a pair of score lines 14 and 12 respectively. End wall panels 35,36 are separated from one another by a pair of spaced and parallel score lines 37 which together form another shoulder panel 38 therebetween. Similarly, end wall panels 39,40 are separated from one another by the spaced and parallel score lines 41 which define the shoulder panel 42. In addition, an intermediate end wall is formed at each side of the blank attached to the side wall 15. Note end walls 31 and 33 which are attached to side wall 15 along the score lines 32,34 respectively.

The blank in FIG. 1 is also applied with suitable cut outs at 57 for water drainage. The cut outs 57 each become substantially aligned with one another when the container is set up and lie in the set up condition adjacent to the drainage openings 59 applied to bottom panel 10. In addition, each of the end wall panels 31,33,35,36,39,40,47,51 and 49,54 include hand hole cut outs 58. Like the water drainage cut outs 57, hand hole cut outs 58 become substantially superimposed upon one another at each end of the container when the container is set up.

FIG. 2 shows the first step in the folding sequence for the container wherein the blank is folded along score line 11 to bring the top part of the blank at a right angle to the remainder of the blank. In this condition, the intermediate end wall panels 31 and 33 are folded inwardly. The next folding step, shown in FIG. 3, occurs when the lower portion of the blank is folded upwardly along score line 13 and the end wall panels 47,51 and 49,54 are folded inward about score lines 48,50 and then folded around the intermediate end wall panels 31,33. These folding steps position the shoulder panels 53,56 at each end of the container for their wire rim supporting condition.

FIG. 4 illustrates the condition of the container after the first two folding steps and shows how the shoulder panels 53,56 act as supports for the wire rim reinforcing member 60. After the wire rim 60 is placed on shoulders 53,56, end wall panels 35,36 and 39,40 are folded over the previously folded panels 31,47,51 and 33,49,54 respectively to lock the ends of the wire rim in place. Meanwhile, side wall panels 43,44 are folded over to secure one side of the wire rim 60 as shown in FIG. 5.

FIG. 6 illustrates the final folding step wherein intermediate bottom wall panels 23,24 are folded around to lie under upper bottom panel 20, and these combined panels are folded downwardly about the scores 17 to form the opposite side wall 15,16 of the container, and, then reversely folded along score line 19 to fit snugly over the first bottom panel 10. At this stage, the locking tabs 25,28 become frictionally engaged in the corners of the container to hold all of the side and end walls in place.

As may be seen, particularly from a review of FIGS. 2–6, the container when finally folded and assembled as shown in FIG. 7, provides a construction having unusual rigidity and resistance to compressive and crushing loads. Because of the material of construction, the container provides a superior resistance to deterioration from the elements and an increased bottom holding capability not achieved by prior art containers. The above noted features are achieved with the container of the present invention partly because of the multiple thickness of the end and side walls and the triple thick bottom. In addition, the use of a top wire reinforcing rim further aids in achieving the strength and bulge resistance characteristics necessary in a container of the type intended. The arrangement of the panels which form the bottom of the container is also critical since it produces a construction with a minimum amount of exposed fluted edges. The container is further characterized by its ease of assembly using no staples, stitches or other elements which effectively reduces the time and costs of set up.

It will be understood by those skilled in the art that although the specification and drawing describe in detail only a single embodiment of the invention, containers of varying shape, depth and cross sectional dimensions could readily be assembled in accordance with the principles of the invention as defined in the appended claims.

I claim:

1. A returnable bottle container prepared from a single blank of corrugated paperboard or the like and having an open top comprising:
    (a) a pair of spaced and parallel end walls, formed by a pair of panels foldably attached to each end of a first bottom panel, a second pair of panels foldably attached to the free ends of a side wall panel at one side of said first bottom panel and a single panel foldably attached to the free ends of a side wall panel at the other side of said first bottom panel, said end wall panels each containing a hand hole cut out and drainage openings, the plurality of which become superimposed upon one another at each end of the container when the panels are folded, wherein each of said end walls comprise a plurality of panels amounting to five thicknesses of paperboard;
    (b) a pair of spaced and parallel side walls, formed by a pair of side wall panels foldably attached to each side of said first bottom panel, each of said side walls comprising a plurality of panels amounting to two thicknesses of paperboard;
    (c) a plurality of shoulder panels, foldably attached between each pair of side wall panels, each pair of end wall panels foldably attached to the ends of said first bottom panel, and each pair of end wall panels foldably attached to the free ends of a side wall panel at one side of said first bottom panel;
    (d) a bottom wall comprising a plurality of panels amounting to three thicknesses of paperboard; and,
    (e) a reinforcing member in the form of a wire rim insert corresponding generally in size and configuration to the open top of the container positioned around the perimeter of the open top of said container in the vicinity of said shoulder panels.

2. The container of claim 1 wherein said bottom wall is formed by said first bottom panel, a second bottom panel foldably attached to one of the side wall panels and a pair of intermediate bottom panels foldably attached to the sides of said second bottom panel and folded to lie between said first and second bottom panels.

3. The container of claim 2 wherein the wire rim insert is adapted to rest on the shoulder panels at each end of said container formed between the end wall panels that are foldably attached to the free ends of a side wall panel and is captured and retained in place by the shoulder panels formed between the side wall panels and the end wall panels foldably attached to said first bottom panel.

4. The container of claim 3 wherein a pair of lock tabs are formed in the paperboard blank in the region between said second bottom panel and said intermediate bottom panels, which locking tabs frictionally engage the end walls of said container in the folded condition to retain the different panels of the container in the set up condition.

* * * * *